US012633192B2

(12) United States Patent
Hawkins et al.

(10) Patent No.: US 12,633,192 B2
(45) Date of Patent: May 19, 2026

(54) SYSTEMS AND METHODS OF ELECTRONIC GAMING

(71) Applicant: ARISTOCRAT TECHNOLOGIES AUSTRALIA PTY LIMITED, North Ryde (AU)

(72) Inventors: Ryan Hawkins, Henderson, NV (US); Robert Honeycutt, Henderson, NV (US); Stephanie Johns, Las Vegas, NV (US)

(73) Assignee: Aristocrat Technologies Australia Pty Limited, North Ryde (AU)

( * ) Notice: Subject to any disclaimer, the term of this patent is extended or adjusted under 35 U.S.C. 154(b) by 0 days.

(21) Appl. No.: 18/474,091

(22) Filed: Sep. 25, 2023

(65) Prior Publication Data

US 2024/0078868 A1 Mar. 7, 2024

Related U.S. Application Data

(63) Continuation of application No. 17/463,234, filed on Aug. 31, 2021, now Pat. No. 11,769,367, which is a (Continued)

(51) Int. Cl.
*G07F 17/32* (2006.01)
*G07F 17/34* (2006.01)

(52) U.S. Cl.
CPC ...... *G07F 17/3213* (2013.01); *G07F 17/3209* (2013.01); *G07F 17/3225* (2013.01); *G07F 17/3246* (2013.01); *G07F 17/3251* (2013.01); *G07F 17/3267* (2013.01); *G07F 17/34* (2013.01)

(58) Field of Classification Search
None
See application file for complete search history.

(56) References Cited

U.S. PATENT DOCUMENTS 6,869,360 B2 3/2005 Marks
7,329,179 B2 2/2008 Baerlocher
(Continued)

FOREIGN PATENT DOCUMENTS

AU 2004235604 B2 11/2010

OTHER PUBLICATIONS

Australian Examination Report No. 2 issued in App. No. AU2022204931, dated Aug. 9, 2024, 3 pages.
(Continued)

*Primary Examiner* — Peter J Iannuzzi
(74) *Attorney, Agent, or Firm* — Armstrong Teasdale LLP

(57) ABSTRACT

Systems, methods, and articles of manufacture for electronic gaming are disclosed. In a first aspect, a method of electronic gaming includes selecting a plurality of primary game symbols, displaying the plurality of primary game symbols, initiating, based upon the plurality of primary game symbols, a secondary game, displaying a trigger symbol in association with the secondary game, displaying a trigger symbol action associated with the trigger symbol, selecting a plurality of secondary game symbols in association with the secondary game (where one of the secondary game symbols comprising the trigger symbol), displaying the plurality of secondary game symbols, and performing the trigger symbol action based upon the trigger symbol.

20 Claims, 9 Drawing Sheets

Related U.S. Application Data continuation of application No. 16/686,622, filed on Nov. 18, 2019, now Pat. No. 11,113,925, which is a continuation of application No. 15/275,407, filed on Sep. 25, 2016, now Pat. No. 10,490,020.

(56) References Cited

U.S. PATENT DOCUMENTS

| | | | | |
|---|---|---|---|---|
| 7,867,077 | B2 | 1/2011 | Baerlocher | |
| 8,197,330 | B2 | 6/2012 | Englman | |
| 8,425,305 | B2 | 4/2013 | Baerlocher | |
| 8,696,438 | B2 | 4/2014 | Englman | |
| 8,858,319 | B2 | 10/2014 | Schultz | |
| 8,864,568 | B2 | 10/2014 | Mizue | |
| 9,336,658 | B2 | 5/2016 | Suda | |
| 9,378,626 | B2 | 6/2016 | Aida | |
| 10,176,665 | B2 | 1/2019 | Hawkins | |
| 10,839,638 | B2 | 11/2020 | Hawkins | |
| 10,957,155 | B2 | 3/2021 | Tam | |
| 11,113,925 | B2 * | 9/2021 | Hawkins | G07F 17/3213 |
| 11,769,367 | B2 * | 9/2023 | Hawkins | G07F 17/3246 463/20 |
| 2004/0048646 | A1 | 3/2004 | Martin | |
| 2005/0288093 | A1 | 12/2005 | Englman | |
| 2008/0254854 | A1 * | 10/2008 | Slomiany | G07F 17/32 463/19 |
| 2008/0274789 | A1 * | 11/2008 | Singer | G07F 17/3211 463/20 |
| 2010/0029381 | A1 * | 2/2010 | Vancura | G07F 17/3267 463/30 |
| 2010/0279760 | A1 | 11/2010 | Sugiyama | |
| 2011/0130199 | A1 * | 6/2011 | Bailey | G07F 17/3272 463/46 |
| 2013/0065663 | A1 * | 3/2013 | Johnson | G07F 17/3213 463/20 |
| 2014/0274348 | A1 | 9/2014 | Baerlocher | |
| 2014/0342802 | A1 | 11/2014 | Itagaki | |
| 2015/0170460 | A1 | 6/2015 | Marais | |
| 2015/0348374 | A1 * | 12/2015 | Dupuis | G07F 17/34 463/20 |
| 2018/0082546 | A1 | 3/2018 | Mariscal | |
| 2018/0089930 | A1 | 3/2018 | Hawkins | |
| 2018/0089953 | A1 | 3/2018 | Palmisano | |
| 2019/0096168 | A1 | 3/2019 | Salmon | |
| 2019/0108719 | A1 | 4/2019 | Hawkins | |
| 2021/0005059 | A1 | 1/2021 | Palmisano | |
| 2021/0264734 | A1 | 8/2021 | Palmisano | |

OTHER PUBLICATIONS

Australian Examination Report No. 1 for AU2020239633 dated Jun. 8, 2021, 4 pages.

Australian Examination Report No. 1 issued in App. No. AU2022203971, dated Jun. 15, 2023, 4 pages.

AU Examination Report in AU Application No. 2019200783, Dated Oct. 9, 2019. 3 Pages.

Notice of Action dated Aug. 18, 2020 for U.S. Appl. No. 16/209,236 (pp. 1-9).

Australian Examination Report for App No. 2019200980, dated Apr. 8, 2020, 2 pages.

Office Action dated Mar. 31, 2021 for U.S. Appl. No. 16/686,622 (pp. 1-5).

Notice of Allowance dated May 14, 2021 for U.S. Appl. No. 16/686,622 (pp. 1-5).

Office Action (Non-Final Rejection) dated Oct. 7, 2021 for U.S. Appl. No. 17/081,698 (pp. 1-6).

Office Action (Notice of Allowance and Fees Due (PTOL-85)) dated Dec. 1, 2021 for U.S. Appl. No. 17/081,698 (pp. 1-8).

Office Action (Non-Final Rejection) dated Mar. 20, 2023 for U.S. Appl. No. 17/713,029 (pp. 1-6).

Office Action (Non-Final Rejection) dated Dec. 22, 2022 for U.S. Appl. No. 17/463,234 (pp. 1-7).

Office Action (Notice of Allowance and Fees Due (PTOL-85)) dated May 24, 2023 for U.S. Appl. No. 17/713,029 (pp. 1-8).

Office Action (Notice of Allowance and Fees Due (PTOL-85)) dated Jun. 8, 2023 for U.S. Appl. No. 17/463,234 (pp. 1-7).

Office Action (Notice of Allowance and Fees Due (PTOL-85)) dated Jul. 28, 2023 for U.S. Appl. No. 17/713,029 (pp. 1-2).

Office Action (Notice of Allowance and Fees Due (PTOL-85)) dated Aug. 28, 2023 for U.S. Appl. No. 17/463,234 (pp. 1-2).

Australian Examination Report No. 1 issued in App. No. AU2022204931, dated Aug. 10, 2023, 3 pages.

Office Action (Notice of Allowance and Fees Due (PTOL-85)) dated Aug. 18, 2023 for U.S. Appl. No. 17/463,234 (pp. 1-2).

Australian Examination Report No. 1 issued in App. No. AU2024205690 dated Jul. 2, 2025 (pp. 1-3).

* cited by examiner

FIG. 9B Cont'

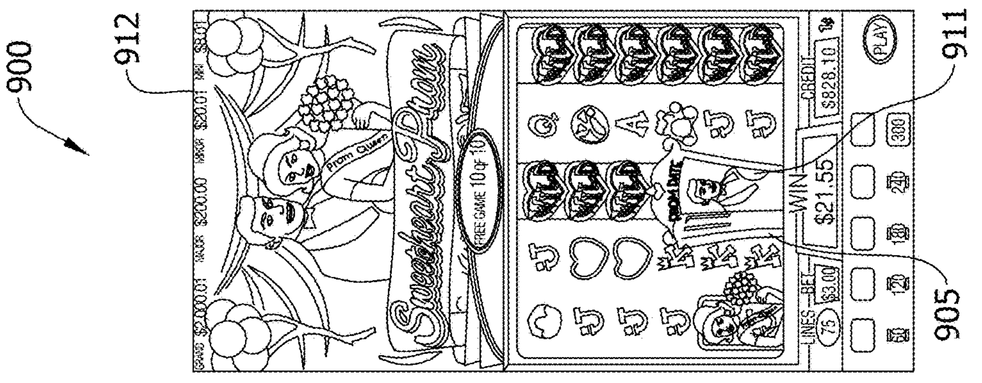
FIG. 9B Cont'
FIG. 9A Cont'

SYSTEMS AND METHODS OF ELECTRONIC GAMING

CROSS REFERENCE TO RELATED APPLICATIONS

This application is a continuation of and claims priority to U.S. patent application Ser. No. 17/463,234, filed Aug. 31, 2021, and titled SYSTEMS AND METHODS OF ELECTRONIC GAMING, which is a continuation of U.S. patent application Ser. No. 16/686,622, now U.S. Pat. No. 11,113,925, filed Nov. 18, 2019, and titled SYSTEMS AND METHODS OF ELECTRONIC GAMING, which is a continuation of U.S. patent application Ser. No. 15/275,407, now U.S. Pat. No. 10,490,020, filed Sep. 25, 2016, and titled SYSTEMS AND METHODS OF ELECTRONIC GAMING, which are incorporated herein by reference in their entireties.

BACKGROUND

The subject matter of the present disclosure relates to a method of electronic gaming, an electronic gaming system, and an article of manufacture for electronic gaming. Conventional gaming systems may employ symbol-driven jackpots, in which a jackpot prize is awarded based upon a winning combination of symbols. A need exists for alternative gaming systems.

SUMMARY

Systems, methods, and articles of manufacture for electronic gaming are disclosed. In a first aspect, a method of electronic gaming includes selecting a plurality of primary game symbols, displaying the plurality of primary game symbols, initiating, based upon the plurality of primary game symbols, a secondary game, displaying a trigger symbol in association with the secondary game, displaying a trigger symbol action associated with the trigger symbol, selecting a plurality of secondary game symbols in association with the secondary game (where one of the secondary game symbols comprising the trigger symbol), displaying the plurality of secondary game symbols, and performing the trigger symbol action based upon the trigger symbol.

In another aspect, an electronic gaming system may include a display configured to display a wagering game, a player input interface configured to receive a player input, a credit input mechanism including at least one of a card reader, a ticket reader, a bill acceptor, and a coin input mechanism, the credit input mechanism configured to receive a credit wager, the credit wager initiating play of a base game.

The electronic gaming system may further comprise a game controller and a tangible, non-transitory, computer-readable storage medium having instructions stored thereon that, in response to execution by the game controller, cause the game controller to perform operations including selecting a plurality of primary game symbols, displaying the plurality of primary game symbols, initiating, based upon the plurality of primary game symbols, a secondary game, displaying a trigger symbol in association with the secondary game, displaying a trigger symbol action associated with the trigger symbol, selecting a plurality of secondary game symbols in association with the secondary game (where one of the secondary game symbols comprising the trigger symbol), displaying the plurality of secondary game symbols, and performing the trigger symbol action based upon the trigger symbol.

In yet another aspect, an article of manufacture a non-transitory, tangible, computer readable storage medium having instructions stored thereon that, in response to execution by a computer-based system configured for electronic gaming, cause the computer-based system to perform operations including selecting a plurality of primary game symbols, displaying the plurality of primary game symbols, initiating, based upon the plurality of primary game symbols, a secondary game, displaying a trigger symbol in association with the secondary game, displaying a trigger symbol action associated with the trigger symbol, selecting a plurality of secondary game symbols in association with the secondary game (where one of the secondary game symbols comprising the trigger symbol), displaying the plurality of secondary game symbols, and performing the trigger symbol action based upon the trigger symbol.

BRIEF DESCRIPTION OF THE DRAWINGS

An exemplary embodiment of the subject matter disclosed will now be described with reference to the accompanying drawings.

FIGS. 9A-9B are screenshots of an exemplary embodiment in which a particular reel strip filled with wild symbols based upon the occurrence of a trigger symbol.

DETAILED DESCRIPTION

Figure 1:
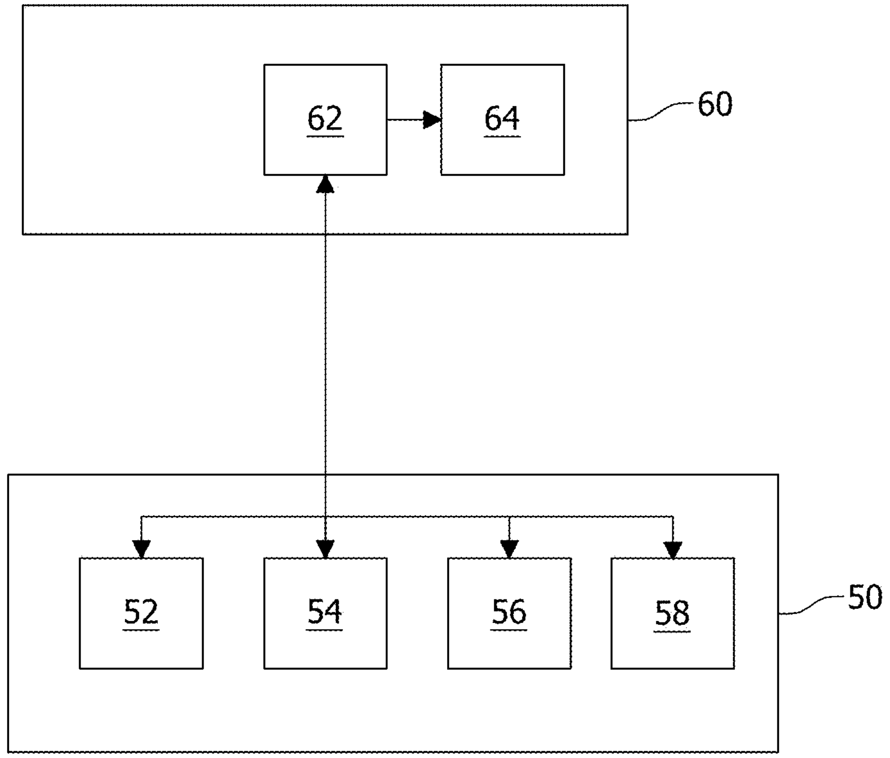
FIG. 1 is a block diagram of the exemplary components of a gaming machine.

Referring to the drawings, a gaming system that includes a game controller is shown. The game controller comprises components that enable the implementation of a General Construction of an Exemplary Gaming System The present disclosure may be implemented in various configurations for gaming machines, including but not limited to: (1) a gaming machine in which the computerized instructions for controlling one or more games are stored within the gaming machine prior to delivery to a gaming establishment; and/or (2) a changeable gaming machine in which the computerized instructions for controlling one or more games are subsequently downloaded to the gaming machine through a data network after the gaming machine is installed within in a gaming establishment.

In an exemplary embodiment, the computerized instructions for controlling one or more games may be executed by a server, such as, for example, a central controller or remote host. In such a "thin client" architecture, the server may remotely control one or more games, or other suitable interfaces, via a gaming network, and the gaming machine may be used to display the games, or suitable interfaces, and to receive inputs or commands from a player.

In another exemplary embodiment, the instructions for controlling one or more games are communicated from a server to a local processor and memory coupled within a gaming machine. In such a "thick client" architecture, a processor of the gaming machine may execute the communicated instructions to control the game or games and/or other suitable interfaces provided to a player.

In another exemplary embodiment, one or more gaming machines within a gaming machine network may utilize a thin client architecture and one or more gaming machines within a gaming machine network may utilize a thick client architecture. Similarly, in various exemplary embodiments, certain functions of a particular gaming machine may be implemented in a thin client architecture and certain other functions of the gaming machine may be implemented in a thick client architecture. For instance, instructions for controlling a game or games may be communicated from a server to one or more network gaming machines operating in a thick client configuration, while instructions for controlling any secondary games or bonus gaming functions may executed by the server in a thin client configuration.

Figure 2:
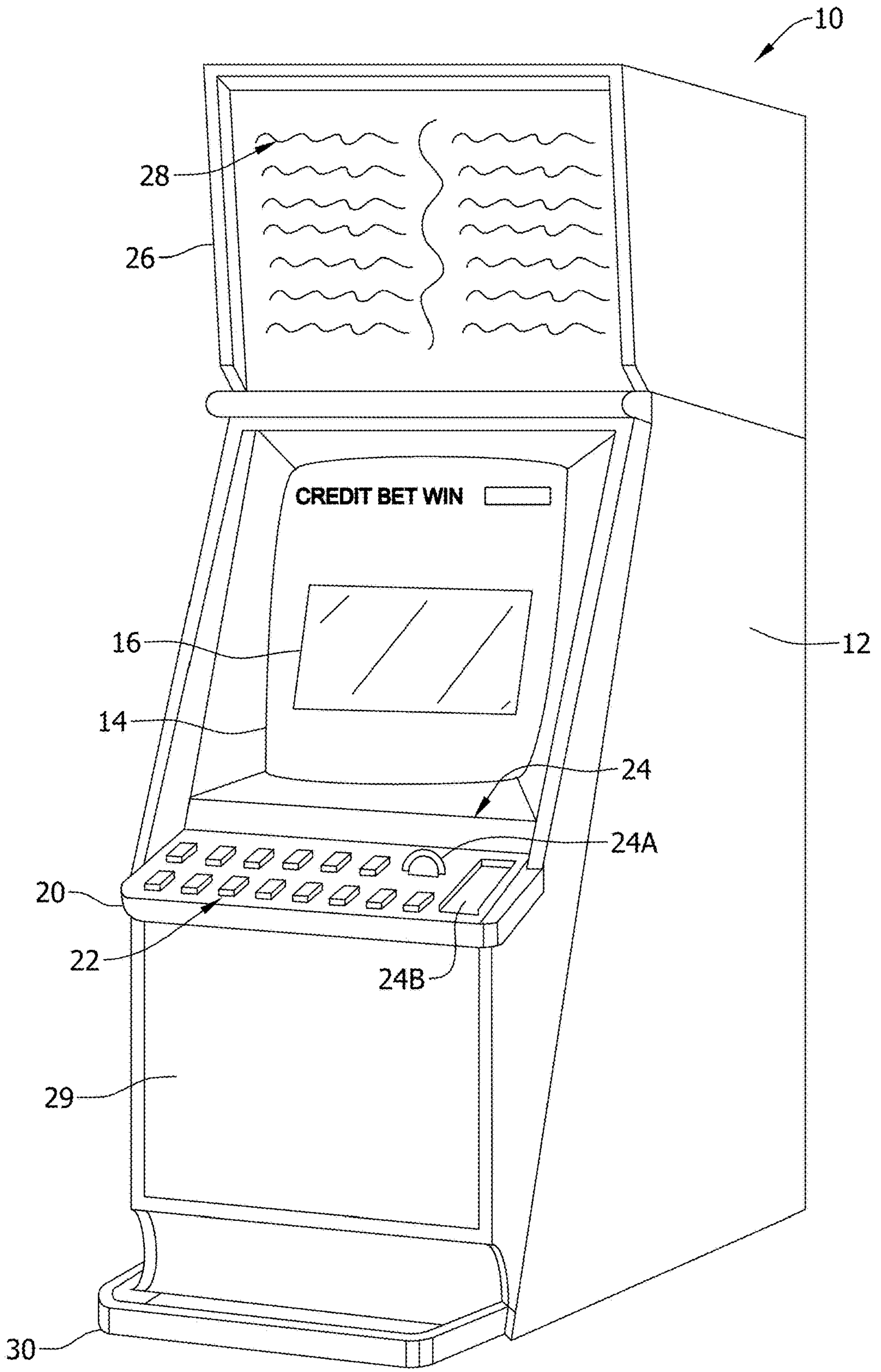
FIG. 2 is a perspective view of an exemplary gaming machine.

FIG. 2 is a perspective view of an exemplary gaming machine 10. Gaming machine 10 may include a support structure, housing, console or cabinet 12 that provides support for a plurality of interface units, displays, inputs, controls and other features of a conventional gaming machine. Gaming machine 10 may be configured so that a player can operate it while standing or sitting. Moreover, gaming machine 10 may be positioned on a base or stand, or can be configured as a pub-style table-top game (not shown) that a player can operate while seated. Gaming machine 10 may include varying numbers and styles of cabinets 12, display configurations, and the like without departing from the scope of the present disclosure.

In an exemplary embodiment, gaming machine 10 may include a display 14. Gaming machine 10 may further include a mid-trim 20, which may house a bank of buttons 22 for enabling a player to interact with gaming machine 10 and/or a credit input mechanism 24.

Gaming machine 10 may also include a player marketing module configured to scan or read a player tracking device, such as, for example a loyalty or player tracking card implemented within a casino as part of a loyalty program. The player tracking device may be in the form of a card, flash drive, and/or any other portable storage medium capable of being read by the reading device. In some embodiments, the player marketing module may be configured to transfer credits between gaming machine 10 and the player tracking device.

Gaming machine 10 may further include a top box 26, which may, in turn, include artwork 28, such as, for example, artwork depicting one or more pay tables, bonus award information, an upper display (not shown), and/or other game information or imagery. Further artwork and/or information may be provided on a front panel 29 of console 12. A coin tray 30 may be mounted beneath front panel 29 for dispensing cash payouts from gaming machine 10.

Display 14 may include, without limitation, a monitor, a television display, a plasma display, a liquid crystal display (LCD) a display based on light emitting diodes (LED), a display based on a plurality of organic light-emitting diodes (OLEDs), a display based on polymer light-emitting diodes (PLEDs), a display based on a plurality of surface-conduction electron-emitters (SEDs), a display including a projected and/or reflected image or any other suitable electronic device or display mechanism. In an exemplary embodiment, display 14 includes a touch-screen or touch-sensitive screen. In various embodiments, display 14 may be of any suitable size and configuration, such as any circular, square, rectangular, or other geometric configuration.

Display 14 may be further configured to provide haptic feedback. Top box 26 may also include a display, which may be of the same or different from display 14.

Display 14 may, in various embodiments, display a game and/or accept game play data from a player. Moreover, display 14 may also display information relating to an interactive game, wager triggering event, or wagering outcome. In an exemplary embodiment, an upper display (not shown) mounted in top box 26 may display any wagering outcome, any suitable secondary game associated or not associated with the interactive game, or any information relating to the interactive games. The upper display may also be configured to accept game play data from a player.

Display 14 may, in addition, serve as digital signage operable to advertise one or more games or other aspects of the gaming establishment. In an exemplary embodiment, gaming machine 10 may also include a credit or fund display 20, which may display a player's current number of credits, cash accumulated, account balance, an original number of credits the player funded the gaming machine with, or an equivalent of any of the aforementioned, and the like. Moreover, in an exemplary embodiment, display 14 may display an amount being wagered or a player's accumulated winnings.

In an exemplary embodiment, and as described in greater detail herein, display 14 may display at least one game or game image, game symbol or symbols, and game indicia, such as any visual representation or exhibition of a movement of objects, including, for example, any mechanical, virtual, or video reels and wheels, dynamic lighting, video images, images of people, characters, places, things and faces of cards, and the like. In various embodiments, the symbols, images and indicia described above may be displayed mechanically, such as by one or more mechanical or physical reels. In other words, display 14 may include any electromechanical device, such as one or more rotatable or spinning wheels, reels or dice, any of which may be configured to display at least one or a plurality of games or other suitable images, symbols or indicia.

FIG. 1 is a block diagram of an exemplary player interface 50 and game controller 60 of gaming machine 10. Player interface 50 and game controller 60 may be housed within gaming machine 10, such as on a printed circuit board located within cabinet 12 of gaming machine 10. As described herein, player interface 50 may be arranged to enable manual interaction between a player and the gaming system and for this purpose includes various input/output components required for the player to enter instructions to play the game and observe the game outcomes.

Components of player interface 50 may include at least one credit input mechanism 24, at least one display 14, a game play mechanism 56 (including one or more input devices that enable a player to input game play instructions or place a wager), and/or one or more audio output devices 58 (e.g., one or more speakers).

Game controller 60 may be in data communication with player interface 50 and may include at least one processor 62 or other suitable controller, such as a microprocessor, a microcontroller-based platform, a suitable integrated circuit or one or more application-specific integrated circuits (ASICs). Processor 62 may be coupled in communication with, or may be operable to access or to exchange signals with, at least one data storage module or memory 64. Processor 62 may thus be configured to retrieve game play instructions from memory 64, process the game play instructions in accordance with game play rules, and output one or more game play outcomes to display 54.

Memory 64 may comprise any suitable tangible, non-transitory, computer-readable storage medium. Memory 64 may store program code and instructions, executable by processor 62, to control gaming machine 10. Memory 64 may also store other data, such as, for example, image data, one or more pay tables or pay table data, event data, player input data, random or pseudo-random number generators, or numbers generated by a random number of pseudo-random number generator, look-up table data, and/or information and applicable game rules that relate to the play of gaming machine 10.

Figure 3:
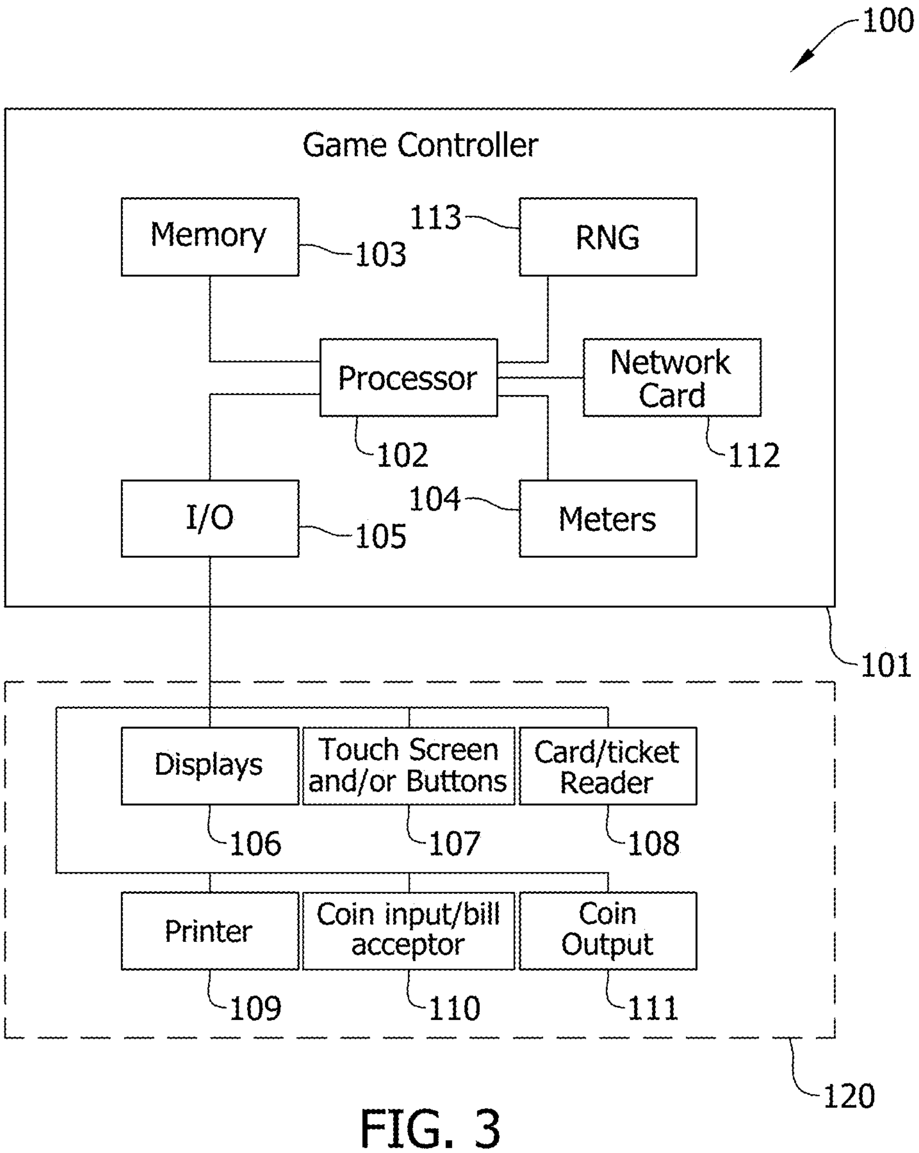
FIG. 3 is a block diagram of exemplary components of a gaming machine.
Figure 4:
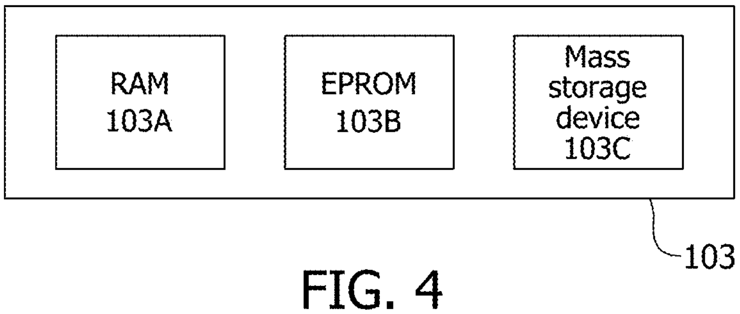
FIG. 4 is a schematic diagram of exemplary components of a memory.

With brief attention to FIG. 4, a block diagram of memory 64 is shown. Memory 64 may, in various embodiments, comprise a memory 103 (as described herein with reference to FIG. 3). Memory 103 may include random access memory (RAM) 103A, such as non-volatile RAM (NVRAM), magnetic RAM (MRAM), ferroelectric RAM (FeRAM) and other forms as commonly understood in the gaming industry. Memory 103 may further include read only memory (ROM), such as EPROM 103B or electrically erasable programmable read only memory (EEPROM). Memory 64 may further include one or more mass storage devices 103C, such as one or more hard drives, one or more solid state or flash memory components, one or more CD and/or DVD drives, and the like. Any other suitable magnetic, optical, and/or semiconductor memory may be used to operate in conjunction with gaming machine 10 that enables gaming machine 10 to function as described herein.

In an exemplary embodiment, RAM 103A may temporarily store one or more program files (and/or other related data) for execution by processor 62. EPROM 103B may comprise a boot ROM device and/or may contain some system or game related code. Mass storage device 103C may store one or more game programs, the integrity of which may be verified and/or authenticated by the processor 62 through the use of protected or encrypted code stored, for example, on EPROM 103B.

In various embodiments, part or all of the program code and/or operating data described above is stored in a detachable or removable memory, including, but not limited to, a suitable cartridge, disk, CD ROM, DVD or USB memory device. In addition, in various embodiments, all or part of the program code and/or operating data described above may be downloadable to memory 64 by way of any suitable computer network.

In an exemplary embodiment, a desktop computer, a laptop personal computer, a personal digital assistant (PDA), a smartphone, a tablet computing device or other portable computing device, and/or any other computerized platform may implement the computing operations of the present disclosure. For example, any suitable mobile computing device, such as any smartphone or tablet computing device, may implement and enable gameplay as described herein. It should be appreciated that each gaming machine 10 disclosed herein may comprise a device that has obtained approval from a regulatory gaming commission or a device that has not obtained approval from a regulatory gaming commission. It should also be appreciated that processor 62 and memory 64 may be collectively referred to herein as a "computer" or "controller."

Returning to FIG. 1, in an exemplary embodiment, credit input mechanism 24 may be coupled in communication with processor 62. Credit input mechanism 24 may include any suitable credit input mechanism or device, such as a coin input chute 24A, a bill or ticket collector 24B, and the like. Credit input mechanism may be configured to receive any suitable monetary credit, such as money, coins, tokens, tickets, and the like. In various embodiments, credit input mechanism 24 may further comprise card reader devices, such as credit or debit card readers or validators for credit cards, debit cards, printed ticket printers and/or readers, and the like.

In various embodiments, a player may insert an identification card (not shown) into a card reader of gaming machine 10. The identification card may be a smart card that includes a programmed microchip or a magnetic strip coded with a player's identification, credit totals (or related data) and other relevant information. A player may further carry a portable device, such as a cell phone or smart phone, a radio frequency identification tag or any other suitable wireless communication device, which communicates a player's identification, credit totals (or related data) and other relevant information to gaming machine 10. In an embodiment, money may be transferred to gaming machine 10 via an electronic funds transfer process. When a player funds gaming machine 10, processor 62 may determine an amount of funds entered and display the corresponding amount on the display 14.

Game play mechanism 56 may include at least one input device that is coupled in communication with processor 62. An input device may include any device that enables a player to produce an input signal that is receivable by processor 62. For example, in one embodiment, after funding gaming machine 10, the input device may comprise a game activation device, such as a pull arm or one or more play button 22 that enables the player to start the game or a sequence of events in gaming machine 10. Play button 22 may comprise any suitable play activator such as a bet one button, a max bet button, or a repeat the bet button. In an embodiment, after appropriate funding of gaming machine 10, game play may begin automatically.

In an exemplary embodiment, one input device may comprise a "Bet One" button. A player may place a wager or bet by pushing the Bet One button and may increase the wager by repeatedly depressing or selecting the Bet One button. In various embodiments, an input device comprises a "Bet Max" button that enables a player to place a maximum wager permitted during a particular game or game session.

In various embodiments, an input device may also comprise a "Cash Out" button. A player may depress or select a Cash Out button to receive a cash payment or other suitable form of payment corresponding to the number of credits remaining. In an embodiment, when the player cashes out, the player receives coins or tokens in a coin payout tray. A player may further receive tickets or credit slips, or the player's electronically recordable identification card may be funded, in response to selection of a Cash Out button.

In various embodiments, an input device may comprise a touch-screen that is coupled to a touch-screen controller, or some other touch-sensitive display overlay, to enable player interaction with images presented on display 14. A touch-screen and/or touch-screen controller may be communicatively coupled to a video controller, such that a player may provide input signals to gaming machine 10 by physically manipulating or interacting with the touch-screen.

Gaming machine 10 may include a sensor, such as a camera (not shown) coupled in communication with processor 62. The camera may, in various embodiments, be controlled by processor 62, such that a player may direct the orientation and focus of the camera to acquire an image of a player actively playing gaming machine 10 and/or a surrounding area of gaming machine 10. In an exemplary embodiment, the camera may selectively acquire still or moving (e.g., video) images and may be configured to acquire the images in either an analog, digital, or other suitable format. Display 14 may be configured to display the image acquired by the camera, as well as to display the visible manifestation of the game in split screen or picture-in-picture fashion. For example, the camera may acquire an image of the player and processor 62 may incorporate that image into the interactive and/or secondary game as a game image, symbol or indicia.

FIG. 3 illustrates a more detailed block diagram of various exemplary functional components of a gaming machine 100, which may be the same as or different from gaming machine 10 (as shown in FIG. 2). The foregoing description of components (e.g., display 14, player interface 50, and game controller 60) may therefore apply to the description of similar components in gaming machine 100. For instance, processor 62 may be the same as or different from 102, as described below. Similarly, memory 64 may be the same as or different from the memory 103, as described below.

Accordingly, gaming machine 100 may include a game controller 101 (which may include a processor 102 mounted on a circuit board, a described in greater detail above). Instructions and data to control operation of processor 102 may be stored in a memory 103 that is in data communication with processor 102. Gaming machine 100 may include both volatile and non-volatile memory and more than one of each type of memory, with such memories being collectively represented by memory 103.

Gaming machine 100 may further include hardware meters 104 (to ensure regulatory compliance and to monitor player credit) and/or an input/output (I/O) interface 105 (for communicating with peripheral devices of gaming machine 100). Input/output interface 105 and/or the peripheral devices may comprise intelligent devices with their own memory for storing associated instructions and data. A random number generator module 113 may generate random numbers for use by processor 102. Persons skilled in the art will appreciate that random number generator module 113 includes a pseudo-random number generator.

In an exemplary embodiment, a player interface 120 includes peripheral devices that communicate with game controller 101 including one or more displays 106, a touch screen and/or input buttons 107 (which provide a game play mechanism), and a credit input mechanism, such as a card and/or ticket reader 108, a printer 109, a bill acceptor and/or coin input mechanism 110, and a coin output mechanism 111. The credit input mechanism is configured to receive a credit wager to initiate play of a base game, and establish a credit balance (e.g., using the received credit wager) that is increasable and decreasable based on wagering activity within a game. Player interface 120 also includes a payout mechanism such as a printer 109 and/or a coin output mechanism 111. The payout mechanism is configured to output a payout to a player of gaming machine 100 based on an outcome of the game (e.g., a base game and/or a feature game).

Additional hardware may be included as part of gaming machine 100, or hardware may be omitted as required for the specific implementation. For example, although buttons or touch screens are typically used in gaming machines to allow a player to place a wager and to initiate a play of a game any input device that enables the player to input game play instructions may be used. For example, in some gaming machines a mechanical handle may be used to initiate a play of the game. Persons skilled in the art will also appreciate that a touch screen can be used to emulate other input devices, such as, for example, a touch screen that can display virtual buttons that a player can "press" by touching the screen where they are displayed.

In addition, gaming machine 100 may include a communications interface, such as, for example a network card 112. Network card 112 may, for example, send status information, accounting information and/or other information to a bonus controller, central controller, server or database and receive data or commands from the bonus controller, central controller, an/or server or database. In various embodiments (e.g., embodiments that employ a player marketing module), communications over a network may be via the player marketing module—e.g., the player marketing module may be in data communication with one or more of the above devices.

In various embodiments, components of gaming machine 100 may be distributed. For example, in an embodiment, input/output devices 106, 107, 108, 109, 110, and 111 may be provided remotely from game controller 101.

Figure 5:
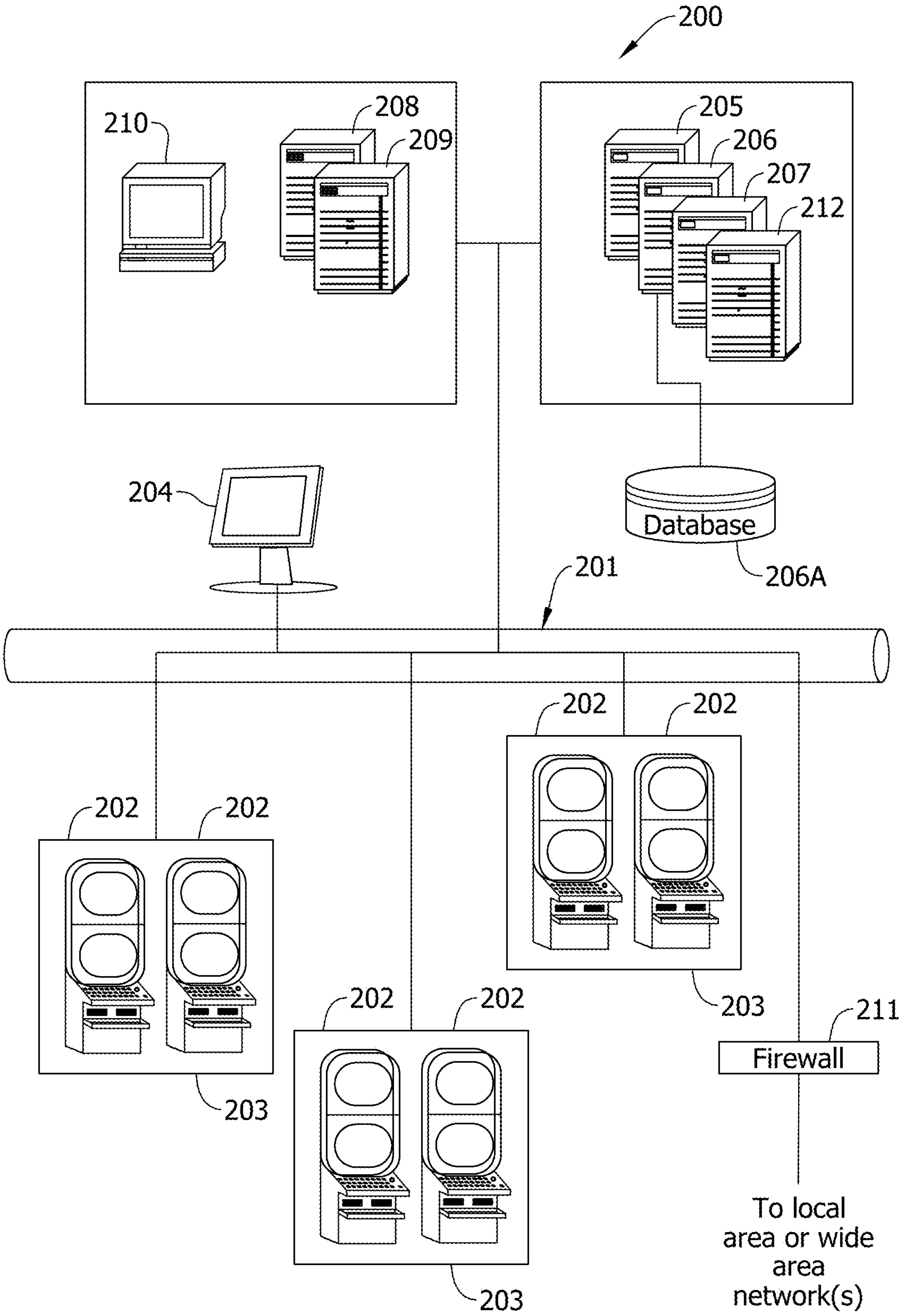
FIG. 5 is a schematic diagram of an exemplary network gaming system.

FIG. 5 illustrates such an exemplary distributed gaming system 200. Gaming system 200 may include a network 201, which, for example, may comprise a wired or wireless network, such as a Wi-Fi or BLUETOOTH network, an Ethernet network, an RS-232 network, and/or any combination thereof. In an exemplary embodiment, gaming machines 202, shown arranged in three banks 203 of two gaming machines 202, are connected to network 201. Gaming machines 202 may provide a player operable interface and may be the same as (or substantially similar to) the gaming machines 10 and 100 (as shown in FIGS. 2 and 3), or may have simplified functionality depending, for example, on various game play requirements.

One or more displays 204 may also be connected to network 201. For example, displays 204 may be associated with one or more banks 203 of gaming machines. Displays 204 may be used to display representations associated with game play on gaming machines 202 and/or used to display other representations, such as, for example promotional or informational material. Displays 204 may be the same as or substantially similar to display 14, as described above.

In a thick client embodiment, game server 205 may implement part of the game played by a player using gaming machine 202, and gaming machine 202 may implement part of the game. In such an embodiment, insofar as both game server 205 and gaming machine 202 may implement part of the game, they may collectively comprise a game controller. A database management server 206 may manage storage of game programs and associated data for downloading or access by gaming machines 202 in a database 206A. Typically, if gaming system 200 enables players to participate in a jackpot game, a jackpot server 207 may be provided to perform accounting functions for the jackpot game. A loyalty program server 212 may also be provided.

In a thin client embodiment, game server 205 may implement most or all of the game played by a player using gaming machine 202, and gaming machine 202 may, in essence, function provide little more than the player interface. In such an embodiment, game server 205 may comprise the game controller. Gaming machine 202 may thus receive player instructions and transmit those instructions to game server 205. Further, in a thin client embodiment, gaming machines 202 may be computer terminals, such as, for example, personal computers, laptop computers, tablet computing devices, smartphones, and the like running software that provides a player interface. Other client/server configurations are contemplated and are within the scope of this disclosure. Additional details of a client/server architecture may be found in WO 2006/052213 and PCT/SE2006/000559, the disclosures of which are incorporated herein by reference in their entireties.

One or more servers may be provided to assist in the administration of gaming system 200. Such servers may include, for example, a gaming floor management server 208, and a licensing server 209 to monitor the use of licenses relating to particular games. An administrator terminal 210 may be provided to allow an administrator to run network 201 and the devices connected to network 201.

Gaming system 200 may communicate with other gaming systems and/or other local networks, such as, for example a corporate network, and/or a wide area network such as the Internet Communications may be filtered through a firewall 211.

Persons skilled in the art will appreciate that in accordance with known techniques, functionality at the server side of network 201 may be distributed over a plurality of different computers. For example, elements may be run as a single "engine" on one server or a separate server may be provided. For example, game server 205 may implement a random number generator engine. Alternatively, a separate random number generator server may be provided. Further, persons skilled in the art will appreciate that a plurality of game servers may be provided to implement different games or a single game server may implement a plurality of different games as required by the terminals.

Further Details of an Exemplary Gaming System

In an exemplary embodiment, a player may place a wager using the game play mechanism 56. A game (or game session) may be initiated in response to placement of the wager, a plurality of symbols randomly drawn, and a game (or game session) outcome determined based upon the symbols drawn. A game outcome may be compared to a pay table (which may be stored in a computer memory) to determine a payout or award (also referred to herein as a win entitlement). Persons skilled in the art will appreciate that a player's wager can be varied from game to game dependent on player selections.

In various embodiments, a wager may include a selection of a number of lines to be played during a game session. Such lines may comprise an interconnected combination of symbol display positions. Each selected line may be evaluated to identify winning combinations of symbols. A pay table (e.g., a pay table stored in memory 64) may be referenced to identify a payout or award based upon an identified winning combination of symbols. In various embodiments, an award may be multiplied or increased by a multiplication factor as well.

In an exemplary embodiment, gaming machine 202 may generate an award that is not based solely upon a number of a lines selected. For example, "scatter" pays (e.g., randomly selected awards that are not identified based upon a plurality of adjacent symbols) may be awarded independently of a player's selection of pay lines.

Further, in various embodiments, a player may select a number of reels (virtual or physical) to play. Games of this type are marketed under the trade name "Reel Power" by Aristocrat Leisure Industries Pty Ltd and are also known as "ways" to win games. Such a reel selection option may permit the substitution of one displayed symbol for another. In other words, all symbols displayed at symbol display positions corresponding to a selected reel may be used to form symbol combinations with symbols displayed at designated symbol display positions of the other reels. For example, if there are five reels and three symbol display positions for each reel, such that the symbol display positions comprise three rows of five symbol display positions, the symbols displayed in the center row may be used for non-selected reels. As a result, the total number of ways to win may be determined by multiplying the number of active display positions of each reel, the active display positions being all display positions of each selected reel and the designated display position of the non-selected reels. In this example, for five reels and fifteen display positions, there are 243 ways to win.

As described in greater detail below, a symbol display may comprise a matrix (e.g., a rectangular matrix) of symbol display positions. The matrix of symbol display positions may, in turn, comprise a plurality of columns and a plurality of rows. In various embodiments, the number of symbol display positions associated with a column may vary from one column to the next. For example, in an exemplary embodiment, a symbol display may include five columns, in which the first column, the third column, and the fifth column include three symbol display positions and in which the second and fourth columns include four symbol display positions (e.g., a 3-4-3-4-3 column formation). Such a column formation includes seventeen display positions. Moreover, in such a formation, adjacent columns may be offset or staggered relative to one another.

As used herein, the terms "primary game" and "base game" may refer to games initiated in response to one of a plurality of game initiation events, such as a wager or credit being received by or transferred to gaming machine 100. A primary game may be associated with a primary game outcome represented by a plurality of primary game symbols, each of which may be selected based upon a random number generated by random number generator 113 (as described more generally above).

Further, as used herein, the terms "secondary game" and "bonus game" may refer generally to a game or a component of a game involving procedures in addition to the primary game. A secondary game may be associated with a secondary game outcome represented by a plurality of secondary game symbols, each of which may be selected based upon a random number generated by random number generator 113 (as described more generally above). A secondary game may be initiated after, or during, a primary game and in response to the occurrence of a particular condition during the primary game. A secondary game may result in a game outcome that increases a primary game award or adds a secondary game award to a primary game award.

The combination of the primary game and the bonus game may be referred to herein as a "game session," unless another meaning is clearly intended. An individual game session is generally associated with a particular time period, and the next individual game session follows the particular time period. Thus, a plurality of individual game sessions may be played in sequence (e.g., one after another).

As used herein, a "reel strip" may comprise a plurality of symbol display positions, each capable of displaying a symbol. More particularly, a symbol display position may include or display a primary game symbol or a secondary game symbol, depending, for example, upon the stage of game play. For instance, during a primary game, a symbol display position may include or display a primary game symbol, while during secondary game play, a symbol display position may include or display a secondary game symbol.

Figure 6:
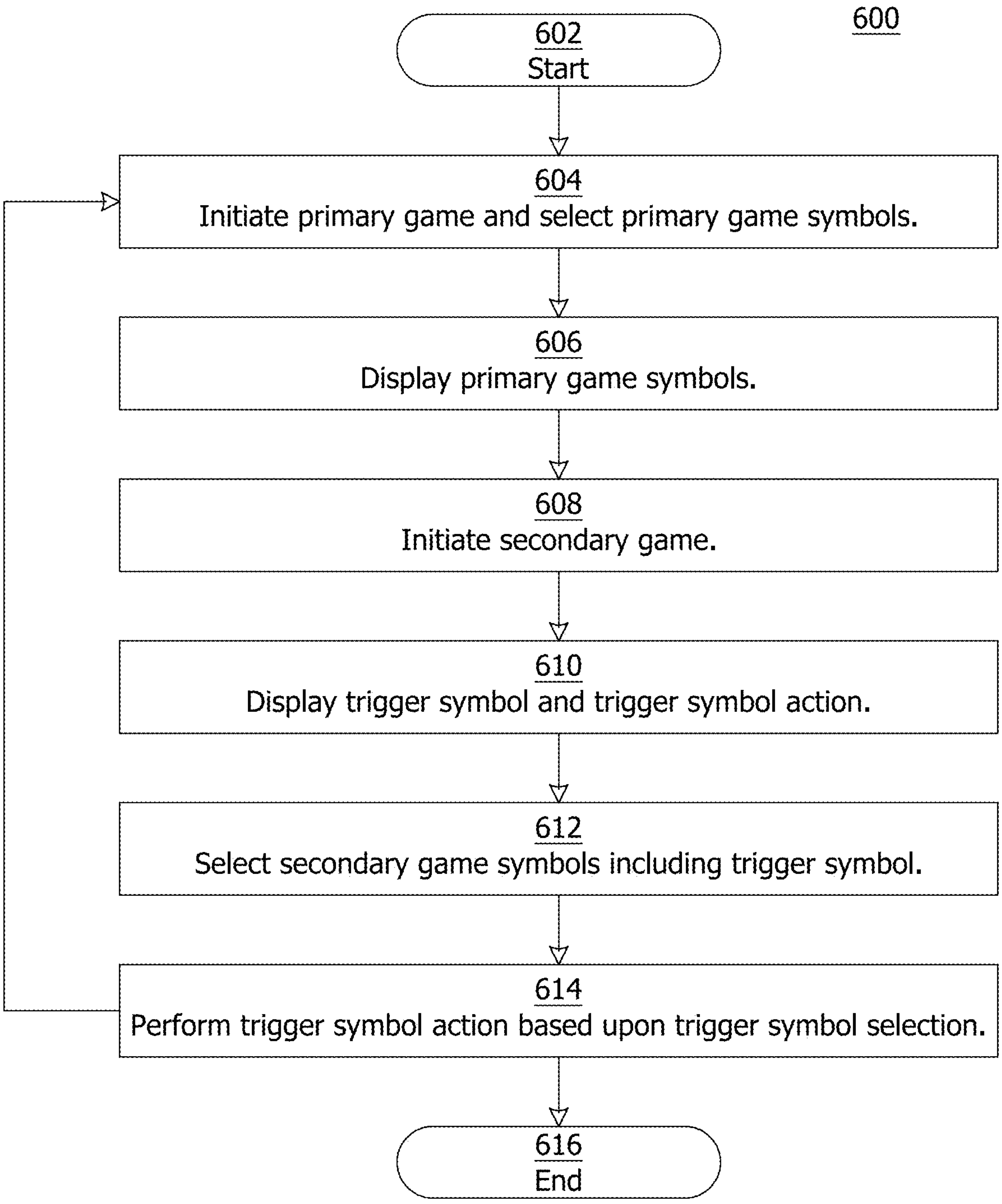
FIG. 6 is a flowchart of an exemplary method of electronic gaming.

With reference now to FIG. 6, a process 600 for electronic gaming is shown. Process 600 is described with reference to a game controller, such as game controller 60 of gaming machine 10 or game controller 101 of gaming machine 100. Process 600 is described below with reference to game controller 60; however, those of skill will appreciate that process 600 may be implemented by game controller 101 and/or any other suitable game controller or game processor.

Accordingly in an exemplary embodiment, game controller 60 may initiate a primary game and, in accordance with game play rules associated with the primary game, select a plurality of primary game symbols (step 604). The primary game symbols may be themed or associated with a primary game theme. For example, a beach themed primary game may include primary game symbols such as surfboards, beachgoers, beach balls, and the like.

The selected primary game symbols may be displayed by game controller 60 (step 606). More particularly, game controller 60 may fill a plurality of symbol display positions (or reel strips that include symbol display positions) with the plurality of selected primary game symbols to display a primary game outcome as a combination of primary game symbols. As described herein, the primary game symbols forming the primary game outcome may be compared to a pay table to determine whether to award a primary game award or prize.

During primary game play, game controller 60 may initiate a secondary game (or a series of secondary games, which may be referred to herein as a "secondary game session) (step 608). The secondary game may be associated with a plurality of secondary game symbols. The secondary game symbols may be different from or the same as the primary game symbols. In some embodiments, some of the secondary game symbols are different from the primary game symbols, while some of the secondary game symbols are the same as the primary game symbols. Like the primary game symbols, the secondary game symbols may be themed or associated with a secondary game theme. For example, a beach themed secondary game may include secondary game symbols such as surfboards, beachgoers, beach balls, and the like.

In an exemplary embodiment, game controller 60 may further designate and/or display a trigger symbol in association with the secondary game (step 610). The trigger symbol may comprise any suitable symbol, such as any primary game symbol or any secondary game symbol. In the exemplary embodiment, the trigger symbol may comprise one of the selected secondary game symbols.

The trigger symbol may be associated with a trigger symbol action. In various embodiments, a trigger symbol action may comprise initiating, by game controller 60, a bonus game or tertiary game within, or during, the secondary game. In an exemplary embodiment, a trigger symbol action may comprise initiating any suitable bonus game, such as, for example, a pick bonus game (form a set or group of pick bonus games), a wheel bonus game (from a set or group of wheel bonus games), and the like. Further, in various embodiments, a trigger symbol action may comprise an action applied during the secondary game, such as, for example, and as described in greater detail below, an action applied to one or more secondary game symbols, an action applied one or more secondary game reel strips, an action applied to a secondary game awards, and the like.

In the exemplary embodiment, game controller 60 may further select a plurality of secondary game symbols in association with the secondary game (step 612). The selected secondary game symbols may variously include or exclude the trigger symbol, depending, for example, upon the secondary game outcome. Specifically, the secondary game symbols selected during each secondary game may include or exclude the trigger symbol. Game controller 60 may, in addition, perform the trigger symbol action that is associated with the selected trigger symbol (step 614).

With reference to FIGS. 7, 8, and 9A-9B, screenshots of various exemplary embodiments are shown. More particularly, exemplary sequences of images displayed by game controller 60 (e.g., on a display of gaming machine 10 or 100, such as display 14 or 106, respectively) are shown. Each of the sequences of images in FIGS. 7, 8, and 9A-9B illustrates a particular secondary game in which a universal or standard trigger symbol (in this case a "door" symbol) is associated with one of several different trigger symbol actions. The sequences progress from left to right and illustrate game play, as described above with respect to FIG. 6, beginning with initiation of a primary game (step 604) and ending with performance of the trigger symbol action (step 614).

Figure 7:
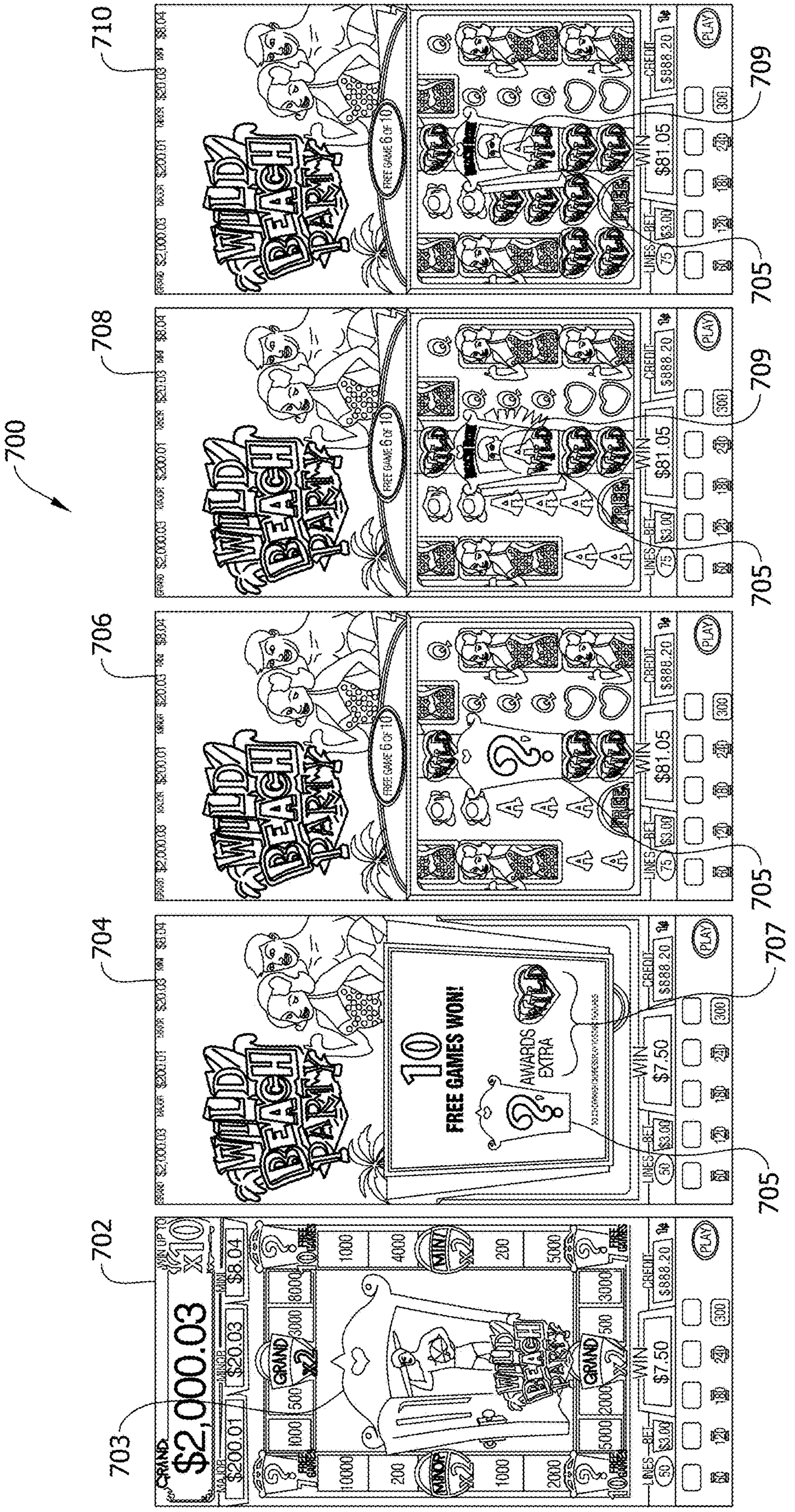
FIG. 7 is a screenshot of an exemplary embodiment in which a particular symbol is made wild based upon the occurrence of a trigger symbol.

Accordingly, with reference to FIG. 7, an exemplary sequence of images 700 displayed by game controller 60 is shown. Sequence 700 illustrates a secondary game in which a trigger symbol is associated with an action to make a particular one of a plurality of secondary symbols a wild symbol. As used herein, a "wild" symbol may comprise a symbol that operates or is evaluated by game controller 60 in a manner similar to a wild card. For example, a wild symbol may represent any other symbol and may be selected to represent a symbol which optimizes or maximizes a game award.

Accordingly, at sequence image 702, a primary game in which a secondary game has been initiated is shown. Initiation of the secondary game is indicated by display of a secondary game icon 703. At sequence image 704, a trigger symbol 705 and corresponding trigger symbol action 707 are shown. In this example, trigger symbol 705 comprises a door or door shaped symbol, and the trigger symbol action is an action to award extra wild symbols, or more particularly, to make certain selected secondary game symbols wild symbols. In various embodiments, trigger symbol 705 may comprise any suitable symbol, such as, for example, a symbol associated with the primary and/or secondary game theme.

At sequence image 706, trigger symbol 705 occurs in the selected plurality of secondary game symbols. In response, and at sequence image 708, trigger symbol 705 is animated by controller 60 to display (or reveal) a particular secondary symbol that will be changed to a wild symbol (or "made wild.") In this example, the "A" symbol 709 is selected for conversion to a wild symbol. Finally, at sequence image 710, each of the "A" symbols occurring in the secondary game are made wild.

Figure 8:
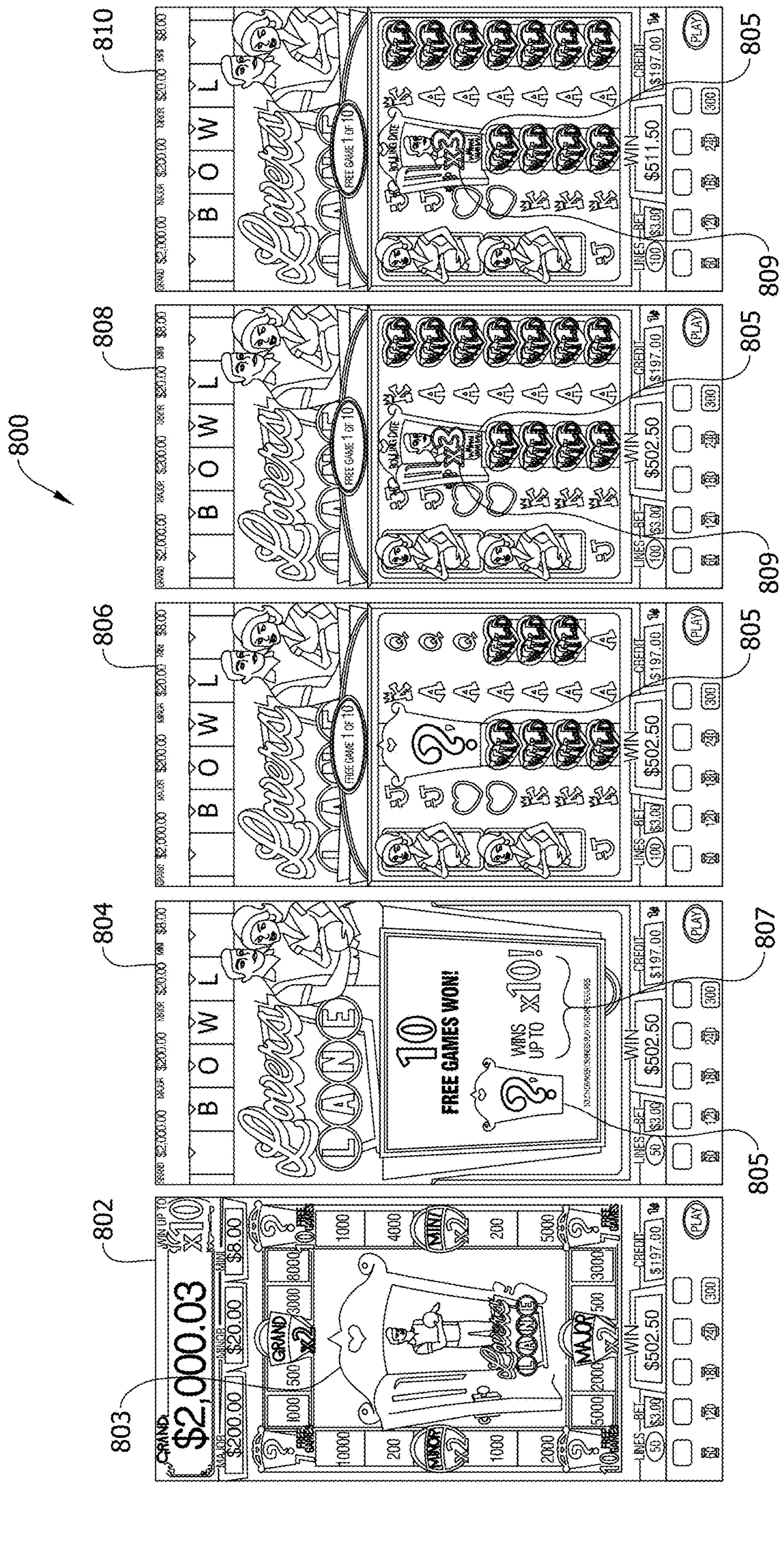
FIG. 8 is a screenshot of an exemplary embodiment in which a game outcome is increased by a multiplication factor based upon the occurrence of a trigger symbol.

In addition, and with reference to FIG. 8, an exemplary sequence of images 800 displayed by game controller 60 is shown. Sequence 800 illustrates a secondary game in which a trigger symbol is associated with an action to multiply a secondary game award (and/or a primary game award) by a multiplier. As described herein, the primary and/or secondary game awards may be determined based upon the combination of selected primary game symbols and/or secondary game symbols in comparison to a pay table.

Therefore, at sequence image 802, a primary game in which a secondary game has been initiated is shown. Initiation of the secondary game is indicated by display of a secondary game icon 803. At sequence image 804, a trigger symbol 805 and corresponding trigger symbol action 807 are shown. In this example, trigger symbol 805 comprises a door or door shaped symbol, and the trigger symbol action is an action to multiply a game award, such as a primary and/or secondary game award, by a multiplier. In various embodiments, trigger symbol 805 may comprise any suitable symbol, such as, for example, a symbol associated with the primary and/or secondary game theme.

At sequence image 806, trigger symbol 805 occurs in the selected plurality of secondary game symbols. In response, and at sequence image 808, trigger symbol 805 is animated by controller 60 to display (or reveal) a multiplier 809 (or multiplication factor) by which the game award will be multiplied. The multiplier 809 may be selected based upon a random number generated by random number generator 113. The multiplier 809 may further be selected from a range of multipliers, such as a range of multipliers from one times the game award to ten times the game award. In this example, the multiplier 809 is three times the game award. Finally, at sequence image 810, the multiplier 809 is applied to the appropriate game award.

Figure 9A:
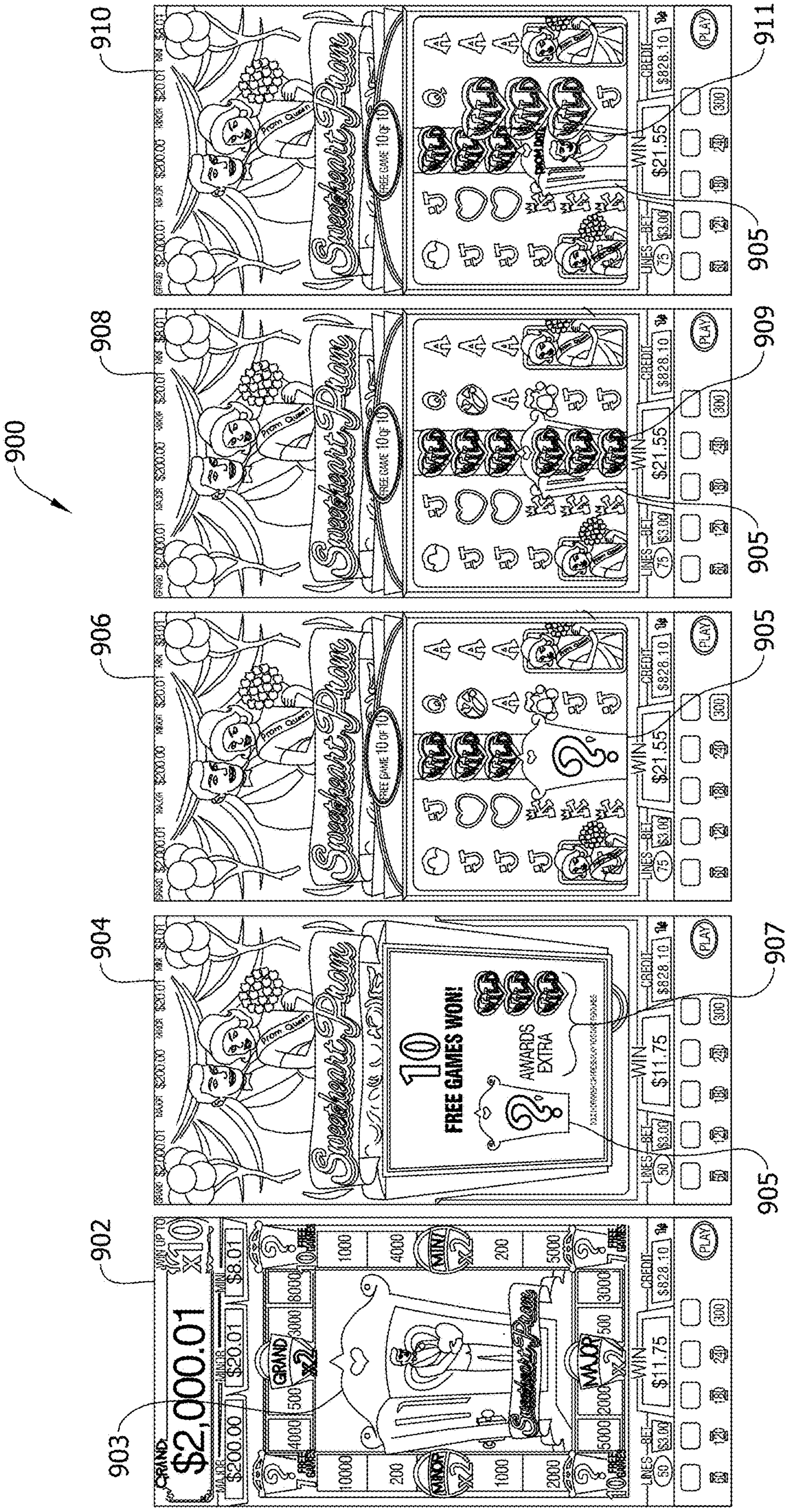

Similarly, and with reference to FIGS. 9A-9B, an exemplary sequence of images 900 displayed by game controller 60 is shown. Sequence 900 illustrates a secondary game in which a trigger symbol is associated with an action to make wild all of the secondary symbols associated with and displayed as part of a particular reel strip.

Accordingly, at sequence image 902, a primary game in which a secondary game has been initiated is shown. Initiation of the secondary game is indicated by display of a secondary game icon 903. At sequence image 904, a trigger symbol 905 and corresponding trigger symbol action 907 are shown. In this example, trigger symbol 905 comprises a door or door shaped symbol, and the trigger symbol action is an action to make wild all of the secondary symbols associated with and displayed as part of a particular reel strip. In various embodiments, trigger symbol 905 may comprise any suitable symbol, such as, for example, a symbol associated with the primary and/or secondary game theme.

At sequence image 906, trigger symbol 905 occurs in the selected plurality of secondary game symbols. In response, and at sequence image 908, trigger symbol 905 is animated by controller 60 to display (or reveal) that the action associated with trigger symbol 905 is to fill a particular reel strip with wild symbols. Finally, at sequence images 910 and 912, each of the secondary symbols occurring in the selected reel strip 911 are made wild.

In various embodiments, a trigger symbol may, in addition, be associated with a trigger symbol action that adds a plurality of additional symbol display positions (and thus a plurality of additional symbols) to one or more reel strips. Thus, a trigger symbol may be associated with a trigger symbol action that causes one or more reel strips to "grow up" or to expand vertically. Such an action may generate a visual effect in which one or more reel strips appears to grow or expand. A trigger symbol may also, in various embodiments, be associated with a trigger symbol action that adds or removes one or more reel strips.

Thus, in an exemplary embodiment, a trigger symbol (e.g., trigger symbol 703, 803, and 903) may be associated with a plurality of different trigger symbol actions but may maintain a particular shape or association with a particular image, such as with an image of a door, to clarify for a player that the particular trigger symbol is always indicative of a game feature, such as a wild conversion feature, an award feature, and the like. The player may thus more quickly come to associate the particular trigger symbol with various trigger symbol actions, which may, in turn, increase the player's understanding of the game and, in turn, to increase player anticipation and enjoyment during game play. A trigger symbol may thus, in this sense, comprise a universal or static trigger symbol that does not change or at least maintains an association with a recognizable symbol, image, or icon irrespective of a particular trigger symbol action or bonus game feature.

As indicated above, the method may be embodied in program code. The program code could be supplied in a number of ways, for example on a tangible computer readable storage medium, such as a disc or a memory device, e.g. an EEPROM, (for example, that could replace part of memory 103) or as a data signal (for example, by transmitting it from a server). Further different parts of the program code can be executed by different devices, for example in a client server relationship. Persons skilled in the art, will appreciate that program code provides a series of instructions executable by the processor.

It will be understood to persons skilled in the art that many modifications may be made without departing from the spirit and scope of the disclosure, in particular it will be apparent that certain features of embodiments of the disclosure can be employed to form further embodiments.

It is to be understood that, if any prior art is referred to herein, such reference does not constitute an admission that the prior art forms a part of the common general knowledge in the art in any country.

In the claims which follow and in the preceding description, except where the context requires otherwise due to express language or necessary implication, the word "comprise" or variations such as "comprises" or "comprising" is used in an inclusive sense, i.e. to specify the presence of the stated features but not to preclude the presence or addition of further features in various embodiments of the disclosure.

What is claimed is:

1. An electronic gaming system comprising:

a game server in communication with a database storing a first portion of data associated with a primary electronic game and data associated with a secondary electronic game; and at least one gaming machine in communication with the game server, the at least one gaming machine comprising:

a display device configured to display the primary electronic game and the secondary electronic game, wherein the secondary electronic game includes a plurality of reels;

at least one memory with instructions stored thereon, the instructions relating to a second portion of data associated with the primary electronic game; and at least one processor in communication with the at least one memory and the game server, wherein the instructions, when executed by the at least one processor, cause the at least one processor to:

initiate the primary electronic game based on the first portion of data associated with the primary electronic game received from the game server and the second portion of data associated with the primary electronic game stored on the at least one memory;

determine that an outcome of the primary electronic game triggers the secondary electronic game; and in response to determining that the secondary electronic game is triggered, receive distinct instructions from the game server relating to the data associated with the secondary electronic game, wherein the distinct instructions, when executed by the at least one processor, further cause the at least one processor to:

cause display, on the display device, of a secondary electronic game icon having a shape and being associated with a plurality of trigger symbol actions;

initiate the secondary electronic game;

identify a trigger symbol action from the plurality of trigger symbol actions as determined by the game server;

cause display, on the display device, of electronic game symbols for a play of the secondary electronic game, the electronic game symbols displayed on the display device, as determined by the game server, in the plurality of reels and including a trigger symbol having the shape of the secondary electronic game icon to indicate that at least one trigger symbol action of the plurality of trigger symbol actions will be applied during the play of the secondary electronic game;

cause display, on the display device, of a conversion of the trigger symbol that reveals which trigger symbol action of the plurality of trigger symbol actions is identified to be applied during the play of the secondary electronic game, wherein the conversion causes the trigger symbol to include a visual indicator symbol associated with the identified trigger symbol action; and perform the identified trigger symbol action after the conversion of the trigger symbol.

2. The electronic gaming system of claim 1, wherein the visual indicator symbol comprises at least one of a wild symbol or a multiplier symbol.

3. The electronic gaming system of claim 2, wherein the identified trigger symbol action is a multiplier action, the visual indicator symbol comprises the multiplier symbol, and wherein the multiplier action comprises multiplying an electronic game award for the outcome of the primary electronic game by a multiplier associated with the multiplier symbol.

4. The electronic gaming system of claim 3, wherein the instructions further cause the at least one processor to select, based upon a random number, the multiplier from a plurality of multipliers.

5. The electronic gaming system of claim 1, wherein the instructions further cause the at least one processor to display the trigger symbol and the visual indicator symbol prior to the play of the secondary electronic game to indicate that at least one instance of the trigger symbol displayed during play of the secondary electronic game will cause application of the identified trigger symbol action.

6. The electronic gaming system of claim 1, wherein the identified trigger symbol action is an extra wild symbols action, and wherein the extra wild symbols action comprises making at least one of the electronic game symbols wild.

7. The electronic gaming system of claim 1, wherein the identified trigger symbol action is a display positions addition action, and wherein the display positions addition action comprises adding a plurality of additional symbol display positions to the secondary electronic game.

8. The electronic gaming system of claim 7, wherein the plurality of additional symbol display positions are added to each of a plurality of reel strips to generate a visual effect in which each of the plurality of reel strips appears to grow vertically.

9. At least one non-transitory computer-readable storage medium with instructions stored thereon that, in response to execution by at least one processor, cause the at least one processor to:

initiate a primary electronic game based on a first portion of data associated with the primary electronic game received from a game server and a second portion of data associated with the primary electronic game included in the instructions stored on the at least one non-transitory computer-readable storage medium;

determine that an outcome of the primary electronic game triggers a secondary electronic game;

in response to determining the secondary electronic game is triggered, receive distinct instructions from the game server relating to data associated with the secondary electronic game, wherein the distinct instructions, when executed by the at least one processor, further cause the at least one processor to:

cause display, on a display device, of a secondary electronic game icon having a shape and being associated with a plurality of trigger symbol actions;

initiate the secondary electronic game;

identify a trigger symbol action from the plurality of trigger symbol actions as determined by the game server, the secondary electronic game including a plurality of reels;

cause display, on the display device, of electronic game symbols for a play of the secondary electronic game, the electronic game symbols displayed on the display device, as determined by the game serve, in the plurality of reels and including a trigger symbol having the shape of the secondary electronic game icon to indicate that at least one trigger symbol action of the plurality of trigger symbol actions will be applied during the play of the secondary electronic game;

cause display, on the display device, of a conversion of the trigger symbol that reveals which trigger symbol action of the plurality of trigger symbol actions is identified to be applied during the play of the secondary electronic game, wherein the conversion causes the trigger symbol to include a visual indicator symbol associated with the identified trigger symbol action; and perform the identified trigger symbol action after the conversion of the trigger symbol.

10. The at least one non-transitory computer-readable storage medium of claim 9, wherein the visual indicator symbol comprises at least one of a wild symbol or a multiplier symbol.

11. The at least one non-transitory computer-readable storage medium of claim 10, wherein the identified trigger symbol action is a multiplier action, the visual indicator symbol comprises the multiplier symbol, and wherein the multiplier action comprises multiplying an electronic game award for the outcome of the primary electronic game by a multiplier associated with the multiplier symbol.

12. The at least one non-transitory computer-readable storage medium of claim 11, wherein the instructions further cause the at least one processor to select, based upon a random number, the multiplier from a plurality of multipliers.

13. The at least one non-transitory computer-readable storage medium of claim 9, wherein the instructions further cause the at least one processor to display the trigger symbol and the visual indicator symbol prior to the play of the secondary electronic game to indicate that at least one instance of the trigger symbol displayed during play of the secondary electronic game will cause application of the identified trigger symbol action.

14. The at least one non-transitory computer-readable storage medium of claim 9, wherein the identified trigger symbol action is an extra wild symbols action, and wherein the extra wild symbols action comprises making at least one of the electronic game symbols wild.

15. The at least one non-transitory computer-readable storage medium of claim 9, wherein the identified trigger symbol action is a display positions addition action, and wherein the display positions addition action comprises adding a plurality of additional symbol display positions to the secondary electronic game.

16. The at least one non-transitory computer-readable storage medium of claim 15, wherein the plurality of additional symbol display positions are added to each of a plurality of reel strips to generate a visual effect in which each of the plurality of reel strips appears to grow vertically.

17. A method of electronic gaming implemented using a gaming system comprising a game server in communication with a database storing a first portion of data associated with a primary electronic game and data associated with a secondary electronic game, and at least one gaming machine in communication with the game server, the at least one gaming machine comprising a display device and at least one processor in communication with at least one memory storing a second portion of data associated with the primary electronic game, the method comprising:

initiating, on the at least one gaming machine, the primary electronic game based on the portion of data associated with the primary electronic game received from the game server and the second portion of data associated with the primary electronic game stored on the at least one memory;

determining, on the at least one gaming machine, that an outcome of the primary electronic game triggers the secondary electronic game;

in response to determining that the secondary electronic game is triggered, receiving distinct instructions from the game server relating to the data associated with the secondary electronic game to be executed by the at least one processor;

causing display, on the display device and based on the received distinct instructions, of a secondary electronic game icon having a shape and being associated with a plurality of trigger symbol actions;

initiating, based on the received distinct instructions, the secondary electronic game;

identifying, based on the received distinct instructions, the trigger symbol action from the plurality of trigger symbol actions;

controlling display on the display device, based on the received distinct instructions, of electronic game symbols for an outcome of the secondary electronic game, the electronic game symbols displayed on the display device in a plurality of reels and including a trigger symbol having the shape of the secondary electronic game icon to indicate that at least one trigger symbol action of the plurality of trigger symbol actions will be applied during the secondary electronic game, wherein the outcome of the secondary electronic game is determined by the game server;

controlling display on the display device, based on the received distinct instructions, of a conversion of the trigger symbol that reveals which trigger symbol action of the plurality of trigger symbol actions is identified to be applied during the secondary electronic game, wherein the conversion causes the trigger symbol to include a visual indicator symbol associated with the identified trigger symbol action; and causing, based on the received distinct instructions, the identified trigger symbol action to be performed after the conversion of the trigger symbol.

18. The method of claim 17, wherein the identified trigger symbol action is a multiplier action, the visual indicator symbol comprises a multiplier symbol, and wherein the multiplier action comprises multiplying an electronic game award for the outcome of the primary electronic game by a multiplier associated with the multiplier symbol.

19. The method of claim 17, wherein the identified trigger symbol action is an extra wild symbols action, and wherein the extra wild symbols action comprises making at least one of the electronic game symbols wild.

20. The method of claim 17, wherein the identified trigger symbol action is a display positions addition action, wherein the display positions addition action comprises adding a plurality of additional symbol display positions to the secondary electronic game, and wherein the plurality of additional symbol display positions are added to each of a plurality of reel strips to generate a visual effect in which each of the plurality of reel strips appears to grow vertically.

* * * * *